United States Patent
Gam et al.

(10) Patent No.: US 6,482,382 B1
(45) Date of Patent: Nov. 19, 2002

(54) PROCESS AND CONVERTER FOR THE PREPARATION OF AMMONIA

(75) Inventors: Erik Andreas Gam, Horsholm (DK); Bjarne Skak Bossen, Allerod (DK)

(73) Assignee: Haldor Topsoe A/S, Lyngby (DK)

(*) Notice: Subject to any disclaimer, the term of this patent is extended or adjusted under 35 U.S.C. 154(b) by 0 days.

(21) Appl. No.: 09/622,475

(22) PCT Filed: Feb. 19, 1999

(86) PCT No.: PCT/EP99/01088
§ 371 (c)(1),
(2), (4) Date: Dec. 22, 2000

(87) PCT Pub. No.: WO99/44939
PCT Pub. Date: Sep. 10, 1999

Related U.S. Application Data
(60) Provisional application No. 60/076,898, filed on Mar. 5, 1998.

(51) Int. Cl.[7] .................... C01C 1/04; B01J 8/04
(52) U.S. Cl. .................. 423/360; 422/148; 422/190; 422/193; 423/361
(58) Field of Search .................. 423/36 D, 361; 422/190, 193, 195, 200, 148

(56) References Cited

U.S. PATENT DOCUMENTS

| | | | | |
|---|---|---|---|---|
| RE19,243 E | * | 7/1934 | Richardson | 423/361 |
| 3,721,532 A | * | 3/1973 | Wright et al. | 423/361 |
| 4,867,959 A | * | 9/1989 | Grotz | 423/360 |
| 5,352,428 A | * | 10/1994 | Bhakta et al. | 423/360 |
| 6,015,537 A | * | 1/2000 | Gam | 423/360 |

FOREIGN PATENT DOCUMENTS

| | | |
|---|---|---|
| EP | 0 121 355 | 10/1984 |
| EP | 0 374 564 | 6/1990 |
| EP | 0 386 693 | 9/1990 |

* cited by examiner

Primary Examiner—Wayne A. Langel
Assistant Examiner—Maribel Medina
(74) Attorney, Agent, or Firm—Armstrong, Westerman & Hattori, LLP

(57) ABSTRACT

Process for the preparation of ammonia, wherein three separate streams of fresh ammonia synthesis gas are used. The ammonia converter contains at least two catalyst beds connected in series. The second and third synthesis gas streams are passed through heat exchanger steps, where they are heated by effluent streams from the first catalyst bed. The preheated streams are mixed with the first synthesis gas stream and are fed to the first catalyst bed. The partly converted synthesis gas is used to heat the second and third stream and is fed to at least the second catalyst bed.

3 Claims, 2 Drawing Sheets

PROCESS AND CONVERTER FOR THE PREPARATION OF AMMONIA

Figure 1:
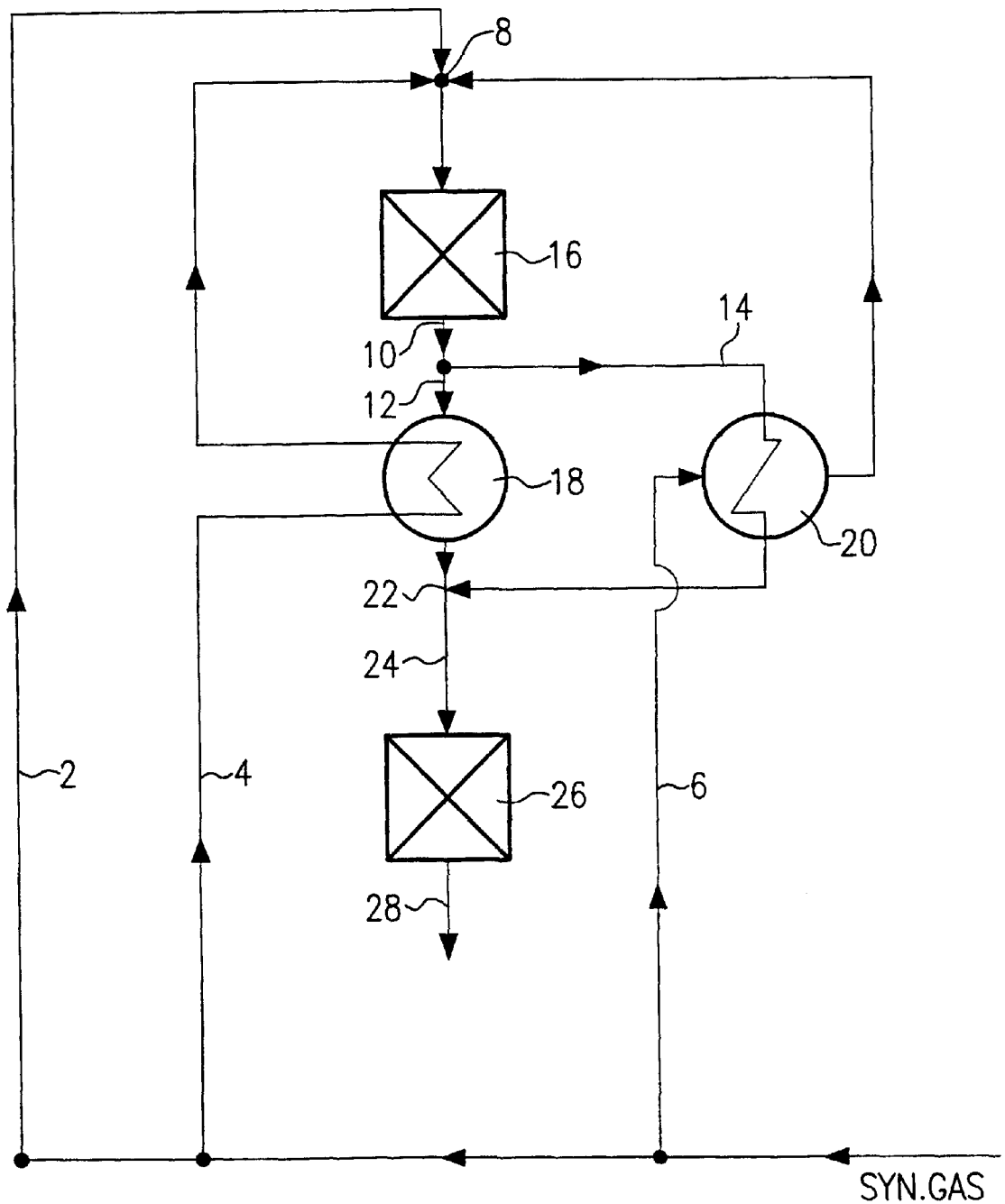

This application claims benefit of provisional application Ser. No. 60/076,898 filed Mar. 5, 1998.

The present invention relates to a process and converter for the preparation of ammonia from an ammonia synthesis gas. In particular, the invention provides certain improvements in the ammonia synthesis process, wherein reacting synthesis gas is indirectly cooled with fresh synthesis gas in an ammonia converter provided with at least two catalyst beds of an ammonia synthesis catalyst.

By the inventive process, three separate streams of fresh ammonia synthesis gas are introduced into an ammonia converter provided with at least two catalyst beds connected in series, a first scream of fresh synthesis gas is passed to a first gas mixing step;

a second stream of fresh syntheses gas is passed to a first indirect heat exchanging step with a first effluent stream from a first catalyst bed; and a third stream of fresh synthesis gas is passed to a second heat exchanging step with a second effluent stream from the first catalyst bed;

the first and second effluent stream are provided by dividing partly converted synthesis gas stream from the first catalyst bed;

the first effluent stream is introduced into the first heat exchanging step and the second effluent steam into the second heat exchanging step and, thereby, the first and second stream of fresh synthesis gas are preheated by heat indirectly supplied from the first and second effluent stream;

the preheated first and second stream are passed to the mixing step, the preheated streams of fresh synthesis gas are mixed and combined with the first stream of fresh synthesis gas to obtain an ammonia process gasstream;

the process gas is introduced into the first catalyst bed and the partially converted synthesis gas stream is withdrawn;

the first and second effluent stream are combined to partly converted process gas; and the partly converted process gas is introduced into at least the second catalyst bed to obtain a product stream being rich in ammonia.

In a sepcific embodiment of the invention the first bed is divided into a first part and second part with quenching of the effluent between the first and second part.

An ammonia converter for use in the above process comprises within a pressure shell at least a first and second catalyst bed being connected in series, a first and second heat exchanger arranged downstream the first catalyst bed, the first and second heat exchanger being connected in parallel and adapted to indirect heating of a first and second stream of fresh ammonia synthesis gas with a partly converted ammonia synthesis gas being withdrawn from the first catalyst bed and divided into a first substream and second substream and introduced into the first and second heat exchanger;

a first mixing device for mixing the first and second preheated stream of fresh ammonia gas with a third stream of fresh ammonia synthesis gas;

a second mixing device for mixing and combining the first and second substream of partly converted ammonia synthesis gas;

means for introducing the combined partly converted synthesis gas into at least the second catalyst bed.

The above ammonia synthesis process and ammonia converter according to a general object of the invention are, in particular, useful in the modernizing of existing ammonia processes and converters.

By the parallel connected heat exchanging steps and parallel heat exchangers, it will be possible to introduce fresh synthesis gas and to withdraw from the process product gas at a high temperature.

As a major advantage of the high outlet temperature obtained in the product gas of the invention, the product gas can be utilized as heating media in the preparation of valuable steam instead of boiler feed water as in the conventional ammonia synthesis process.

Figure 2:
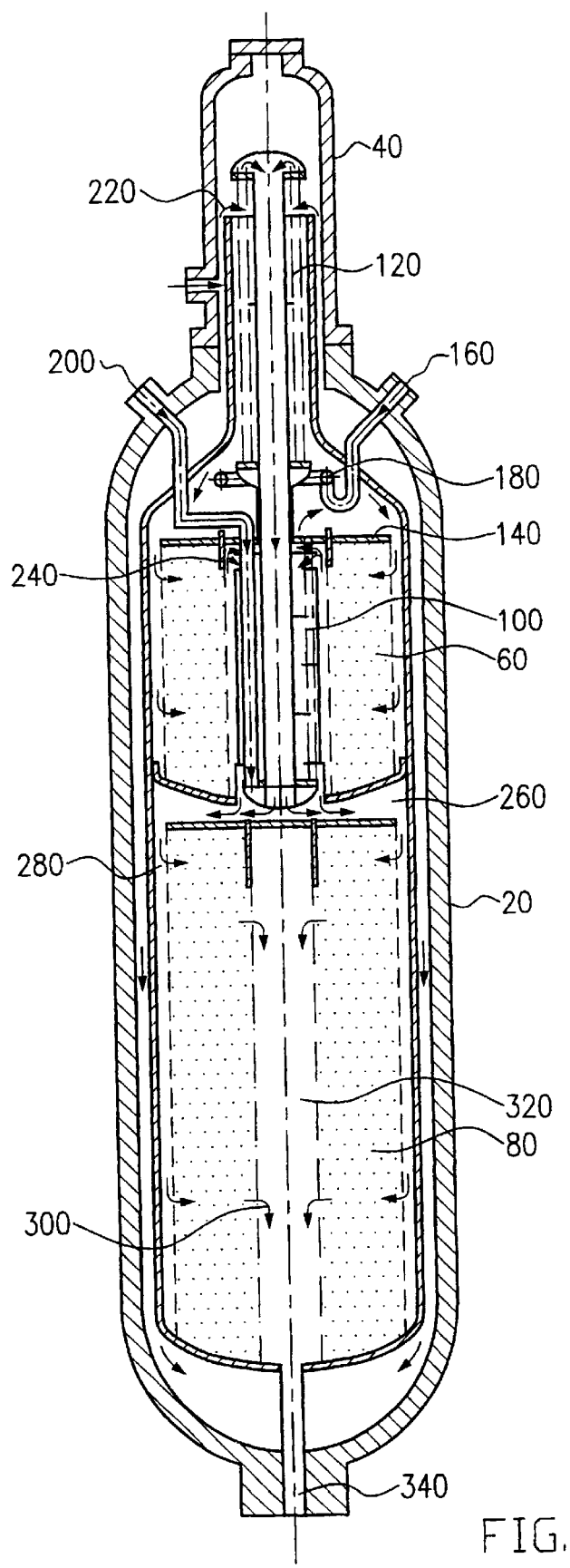

In the following detailed description, the invention will be illustrated more detailed by reference to the drawings, in which:

FIG. 1 is a simplified process diagram of a specific embodiment of the invention; and FIG. 2 shows an ammonia converter according to a specific embodiment of the invention.

Referring now to FIG. 1, a main stream of fresh ammonia synthesis gas is split to a first, second and third stream 2, 4, 6. Stream 2 is passed to a mixing point 8, where stream 2 is mixed and combined with stream 4 and 6. Prior to combination with stream 2, stream 4 is preheated by indirect heat exchange in heat exchanger 18 with a substream 12 of partly converted ammonia synthesis gas being withdrawn in stream 10 from a first ammonia catalyst bed 16 stream 6 is preheated by indirect heat exchange in heat exchanger 20 with substream 14 of the partly converted ammonia synthesis gas. Having supplied heat to stream 4 and 6, substreams 12 and 14 are recombined and mixed in mixing point 22 and the combined stream is then introduced into second ammonia catalyst bed for further conversion of stream 24. A product stream 28 being rich in produced ammonia is withdrawn from bed 26.

An ammonia converter being useful in carrying out the above process is shown in FIG. 2.

In FIG. 2, the converter comprises within a cylindrical pressure shell 20 with a bottle necked top portion 40, a first and second annular ammonia catalyst bed 60 and 80 arranged in series;

a first heat exchanger 100 arranged centrally within an annular space in bed 60; and a second bed exchanger 120 arranged within top portion 40 of shell 20.

Heat exchanger 100 and 120 are connected in parallel by gas dividing device 140.

Fresh ammonia synthesis gas is introduced into the converter in three separate streams.

A first stream is introduced through passage 160 into mixing space 180 provided in upper portion of shell 20. A second stream is passed through duct 200 in the upper portion to tube side in heat exchanger 100 and a third stream into top portion 40 of shell 20 and passed through passageway 220 to shell side of heat exchanger 120. By passage through heat exchanger 100 and 120, the second and third stream are preheated by indirect heat exchange with hot effluent gas 240 from catalyst bed 60, being divided into two substreams by means of dividing device 140 and passed through in one substream through heat exchanger 100 and in another substream through heat exchanger 120. The preheated second and third stream of ammonia synthesis gas are then combined with the first stream in mixing space 180 to ammonia process gas. The process gas passes through bed 60 in radial flow direction in contact with an ammonia synthesis catalyst and is thereby converted to effluent stream 240. Having supplied heat to the second and third ammonia synthesis gas stream as described above, the substreams of effluent 240 are recombined in mixing space 260 arranged between catalyst bed 60 and 80.

The combined effluent stream 280 is then passed radially through catalyst bed 80 and further converted to product gas 300 being rich in ammonia by contact with ammonia synthesis catalyst arranged in bed 80. The product gas is finally withdrawn from the converter through duct 320 centrally arranged in catalyst bed 80 and through outlet 340 in bottom portion of shell 2.

What is claimed is:

1. Process for the preparation of ammonia, wherein three separate streams of fresh ammonia synthesis gas are introduced into an ammonia converter provided with at least two catalyst beds connected in series, a first stream of fresh synthesis gas is passed to a first gas mixing step;

a second stream of fresh synthesis gas is passed to a first indirect heat exchanging step with a first effluent stream from a first catalyst bed; and a third stream of fresh synthesis gas is passed to a second heat exchanging step with a second effluent stream from the first catalyst bed;

the first and second effluent streams are provided by dividing a partly converted synthesis gas stream from the first catalyst bed;

the first effluent stream is introduced into the first heat exchanging step and the second effluent stream into the second heat exchanging step and, thereby, the second and third streams of fresh synthesis gas are preheated by heat indirectly supplied from the first and second effluent streams;

the preheated second and third streams are passed to the mixing step, the preheated streams of fresh synthesis gas are mixed and combined with the first stream of fresh synthesis gas to obtain an ammonia process gas stream;

the process gas is introduced into the first catalyst bed and the partially converted synthesis gas stream is withdrawn;

the first and second effluent streams are combined to partly converted process gas; and the partly converted process gas is introduced into at least the second catalyst bed to obtain a product stream being rich in ammonia.

2. Process of claim 1, wherein the first bed is divided into a first part and second part with quenching of the effluent between the first and second parts.

3. Ammonia converter comprising within a pressure shell at least first and second catalyst beds being connected in series, first and second heat exchangers arranged downstream the first catalyst bed, the first and second heat exchangers being connected in parallel and adapted to indirect heating of first and second streams of fresh ammonia synthesis gas with a partly converted ammonia synthesis gas being withdrawn from the first catalyst bed and divided into a first substream and second substream by means of a dividing device and introduced into the first and second heat exchangers;

a first mixing device for mixing the first and second preheated streams of fresh ammonia gas with a third stream of fresh ammonia synthesis gas;

a second mixing device for mixing and combining the first and second substreams of partly converted ammonia synthesis gas;

means for introducing the combined partly converted synthesis gas into at least the second catalyst bed.

* * * * *